US 6,670,417 B2

(12) United States Patent
Foreman et al.

(10) Patent No.: US 6,670,417 B2
(45) Date of Patent: Dec. 30, 2003

(54) RUBBER-ACRYLIC ADHESIVE FORMULATION

(75) Inventors: Paul B. Foreman, Somerville, NJ (US); Smita M. Shah, Edison, NJ (US); Rama Chandran, Bridgewater, NJ (US); Patrick S. Eaton, Hillsborough, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 10/366,029

(22) Filed: Feb. 13, 2003

(65) Prior Publication Data

US 2003/0166767 A1 Sep. 4, 2003

Related U.S. Application Data

(62) Division of application No. 09/809,802, filed on Mar. 16, 2001.
(51) Int. Cl.[7] .................................................. C08K 3/00
(52) U.S. Cl. ........................ 524/504; 524/529; 524/533; 524/536; 523/456
(58) Field of Search ................................ 524/504, 533, 524/536, 529; 523/456

(56) References Cited

U.S. PATENT DOCUMENTS

| | | | | |
|---|---|---|---|---|
| 3,532,708 A | * | 10/1970 | Blance | 524/300 |
| 3,769,254 A | * | 10/1973 | Anderson et al. | 428/355 AC |
| 3,886,126 A | | 5/1975 | McKenna, Jr. | 260/80.73 |
| 4,234,660 A | | 11/1980 | McKenna, Jr. et al. | 428/411 |
| 4,418,120 A | | 11/1983 | Kealy et al. | 428/343 |
| 5,057,366 A | * | 10/1991 | Husman et al. | 428/355 CN |
| 5,380,779 A | * | 1/1995 | D'Haese | 524/272 |
| 5,434,213 A | | 7/1995 | Chen et al. | 524/533 |
| 5,625,005 A | * | 4/1997 | Mallya et al. | 525/301 |
| 5,726,247 A | | 3/1998 | Michalczyk et al. | 525/102 |

FOREIGN PATENT DOCUMENTS

WO  WO 98/37112  8/1998

* cited by examiner

Primary Examiner—Peter D. Mulcahy
Assistant Examiner—Henry S. Hu
(74) Attorney, Agent, or Firm—Cynthia L. Foulke

(57) ABSTRACT

Pressure sensitive adhesive formulations of an acrylic polymer grafted with a hydrogenated rubber. In one embodiment, the polymer contains a hydroxyalkyl (meth)acrylate ester which is crosslinked with a titanium-containing chelated metal alkoxide. The adhesive formulations provide an exceptional combination of adhesion to low energy surfaces and high temperature cohesive strength.

10 Claims, No Drawings

RUBBER-ACRYLIC ADHESIVE FORMULATION

This is a division of application Ser. No. 09/809,862, filed Mar. 16, 2001.

FIELD OF THE INVENTION

The present invention relates to pressure sensitive adhesive formulations. In particular, the invention relates to a pressure sensitive adhesive formulation comprising an acrylic polymer grafted with an ethylene-butylene rubber macromer.

BACKGROUND OF THE INVENTION

Typical acrylic pressure sensitive adhesive formulations are copolymers of alkyl ester monomers, a functional monomer such as acrylic acid, and may be crosslinked using, for example, aluminum chelates. These adhesives are generally deficient in adhesion to low energy surfaces. While adhesives may be tackified with rosin esters to improve low surface energy adhesion, tackification results in loss of heat resistance and poor aging properties. Even though good aging properties are compromised, tackified acrylic dispersions are sufficient for some applications, e.g. most paper label uses and, indeed, have become the dominant paper label technology. These tackified acrylic adhesives, however, do not have sufficient resistance to degradation for most graphics and industrial tape applications in which acrylic solutions are conventionally used.

Rubber-resin formulations are often used to adhere to polyolefins and other low energy substrates. Typical compositions are natural rubber or styrene block copolymers tackified With rosin esters. These formulations provide excellent tack and cohesive strength but discolor and lose tack on aging due to oxidative and UV light induced degradation. Formulations of fully hydrogenated rubbers and resins, besides being more costly, generally do not have the required adhesive performance.

U.S. Pat. No. 5,625,005 discloses hybrid rubber-acrylic pressure sensitive adhesives described as having good UV resistance and aging characteristics along with high adhesion to non-polar surfaces. Despite this advancement in the art, there remains a need for improved polymer compositions which can be used to prepare pressure sensitive adhesives having sufficient adhesion and chemical resistance properties for applications such as industrial tapes and transfer films, and exterior graphics applications on low energy, difficult to adhere surfaces. The present invention addresses this need.

SUMMARY OF THE INVENTION

The invention provides adhesive formulations having outstanding coating characteristics, adhesion to a wide variety of substrates, including low energy surfaces, while maintaining these performance properties at higher temperatures in their dried state.

One aspect of the invention is directed to a pressure-sensitive adhesive comprising an acrylic polymer grafted with a rubber macromer. Preferred for use is an ethylene-butylene macromer. In one embodiment, the acrylic polymer comprises at least one low glass transition temperature (Tg) alkyl acrylate monomer containing from about 4 to about 18 carbon atoms in the alkyl group and at least one monomer having a high glass transition temperature (i.e., a Tg greater than about 0° C.). In preferred embodiments of the invention the acrylic polymer may further comprise at least one hydroxy functional monomer and/or may also comprise at least one carboxy functional monomer. In a particularly preferred embodiment, a crosslinking agent, such as an aluminum or a titanium crosslinking agent, is used.

Another aspect of the invention is directed to a pressure-sensitive adhesive comprising an acrylic polymer comprising at least one low Tg alkyl acrylate monomer containing from about 4 to about 18 carbon atoms in the alkyl group grafted with a rubber macromer, preferably, an ethylene-butylene macromer, the polymer being crosslinked using a titanium crosslinking agent. In a preferred embodiment, the acrylic polymer comprises, in addition to an alkyl acrylate monomer, at least one high Tg monomer, at least one hydroxy functional monomer and/or at least one carboxy functional monomer. The use of a titanium-containing metal alkoxide crosslinker has been discovered to impart excellent and unexpected high temperature performance.

Still another aspect of the invention is directed to a process of making a pressure-sensitive adhesive comprising an acrylic polymer grafted with a rubber macromer, preferably an ethylene-butylene macromer, wherein the macromer is substantially free of metal or strong acid. Preferably, the molecular weight of the macromer used to make the adhesive ranges from about 2,000 to about 10,000. The process comprises reacting an acrylic polymer component with a rubber macromer component, said macromer component being substantially free of catalyst used to prepare the macromer component.

Yet another aspect of the invention is directed adhesive articles, e.g., industrial tapes, transfer films, and the like, comprising a pressure sensitive adhesive hybrid polymer. In one particularly preferred embodiment, the hybrid polymer comprises an ethylene-butylene macromer, 2-ethylhexyl acrylate or similar low Tg acrylic monomer, methyl acrylate or similar high Tg monomer, and preferably a hydroxy functional monomer such as hydroxyethyl acrylate.

DETAILED DESCRIPTION OF THE INVENTION

As used herein, the term "pressure-sensitive adhesive" refers to a viscoelastic material which adheres instantaneously to most substrates with the application of slight pressure and remains permanently tacky. A polymer is a pressure-sensitive adhesive within the meaning of the term as used herein if it has the properties of a pressure-sensitive adhesive per se or functions as a pressure-sensitive adhesive by admixture with tackifiers, plasticizers or other additives.

The adhesive polymer of the invention is a rubber-acrylic hybrid polymer comprising an acrylic polymer backbone grafted with rubber macromers including, but not limited to, ethylene-butylene macromers, ethylene-propylene macromers and ethylene-butylene-propylene macromers. In general, the hybrid polymers are made by copolymerizing alkyl acrylate ester monomers in the presence of a macromer containing a reactive acrylic or methacrylic end group. This leads to a comb-type copolymer having an acrylic backbone and side chains of macromer.

More specifically, acrylic polymer backbone contemplated for use in the practice of the invention is formed of acrylate monomers of one or more low Tg alkyl acrylates. Low transition temperature monomers are those having a Tg of less than about 0° C. Preferred alkyl acrylates which may be used to practice the invention have up to about 18 carbon atoms in the alkyl group, preferably from about 4 to about 10 carbon atoms in the alkyl group. Alkyl acrylates for use in the invention include butyl acrylate, amyl acrylate, hexyl acrylate, 2-ethylhexyl acrylate, isooctyl acrylate, decyl acrylate, dodecyl acrylates, isomers thereof, and combinations thereof. A preferred alkyl acrylate for use in the practice of the invention is 2-ethyl hexyl acrylate.

The monomer system used to make the acrylic backbone polymer could be solely based on lowly Tg alkyl acrylate ester monomers, but is preferably modified by inclusion of high Tg monomers and/or functional comonomers, in particular carboxy-containing functional monomers, and/or, even more preferably, hydroxy-containing functional monomers.

High Tg monomer components which may be present, and in some embodiments are preferably present, include methyl acrylate, ethyl acrylate, isobutyl methacrylate, and/or vinyl acetate. The high Tg monomers may be present in a total amount of up to about 50% by weight, preferably from about 5 to about 50% by weight, even more preferably from about 10 to about 40% by weight, based on total weight of the hybrid polymer.

The acrylic backbone polymer may also comprise one or more functional monomers. Preferred are carboxy and/or hydroxy functional monomers.

Carboxy functional monomers will typically be present in the hybrid polymer in an amount of up to about 7% by weight, more typically from about 1 to about 5% by weight, based on the total weight of the monomers. Useful carboxylic acids preferably contain from about 3 to about 5 carbon atoms and include, among others, acrylic acid, methacrylic acid, itaconic acid, and the like. Acrylic acid, methacrylic acid and mixtures thereof are preferred.

In a particularly preferred embodiment, the acrylic backbone comprises hydroxy functional monomers such as hydroxyalkyl (meth)acrylate esters, and acrylic polymers used to form the backbone of the invention are preferably acrylic ester/hydroxy (meth)alkyl ester copolymers. Specific examples of hydroxy functional monomers include hydroxyethyl acrylate, hydroxypropyl acrylate, hydroxyethyl methacrylate and hydroxypropyl methacrylate. Hydroxy functional monomers are generally used in an amount of from about 1 to about 10%, preferably from about 3 to about 7%.

Other comonomers can be used to modify the Tg of the acrylic polymer, to further enhance adhesion to various surfaces and/or to further enhance high temperature shear properties. Such comonomers include N-vinyl pyrrolidone, N-vinyl caprolactam, N-alkyl (meth)acrylamides such as t-octyl acrylamide, cyanoethylacrylates, diacetoneacrylamide, N-vinyl acetamide, N-vinyl formamide, glycidyl methacrylate and allyl glycidyl ether.

The monomer proportions of the acrylic polymer are adjusted in such a way that the backbone polymer has a glass transition temperature of less than about –10° C., preferably from about –20° C. to about –60° C.

The macromers which may be used to prepare the graft copolymers have a glass transition temperature of about –30° C. or less, preferably about –50° C. to about –70° C., as determined by differential scanning calorimetry (DSC), and are preferably present in an amount of from about 5 to about 50 percent by weight of the hybrid polymer. Such macromers are commercially available from Kraton Polymers Company. While the molecular weight of the macromer can range from about 2,000 to about 30,000, macromers for use in practicing the invention will preferably have a molecular weight range of from about 2,000 to about 10,000, as determined by gel permeation chromatography (GPC).

Conventionally, saturated rubber macromers may be prepared by a number of well-known methods. One method involves an anionic polymerization to produce a hydroxyl terminated conjugated diene polymer formed from, for example, 1,3-butadiene and/or isoprene monomer, as described in U.S. Pat. No. 5,625,005, the disclosure of which is incorporated herein by reference. Reduction of at least 90%, preferably at least 95%, of the unsaturation in the low molecular weight monool can be achieved through catalytic hydrogenation as taught in U.S. Pat. Nos. Re. 27,145 and 4,970,254, the disclosures of which are incorporated by reference herein. Suitable saturated rubber monools are available from Kraton Polymers Company. Kraton® L 1203 is a preferred grade. In the final step, the hydroxyl termination is reacted to form an acrylate or methacrylate group by any of a number of well known methods. These include esterification or transesterification using a strong acid or metal-containing catalyst, (e.g., compounds of Ti, Sn and the like), by reaction with an acid chloride, or via a urethane reaction employing a metal catalyst, as described in U.S. Pat. No. 5,625,005.

It has now been discovered that metal or acid residue present in the macromer used to prepare rubber acrylic hybrid polymer-based adhesives, in particular those comprising hydroxyl functional-containing polymers, can adversely affect adhesive properties. While certain low levels of metal or acid may be used for certain applications, it is preferable that the macromers be substantially free of the catalyst used in the polymerization thereof. Substantially free, as this term is defined herein, means that any catalyst residue remaining in the polymerized macromer, if any, will not cause problems in the preparation of the hybrid polymer. Removal of cataylst residue can be readily accomplished using methods well-known in the art.

The hybrid polymer of the invention may be prepared by conventional polymerization methods familiar to those of skill in the art. These methods include, without limitation, solution polymerization, suspension polymerization and bulk polymerization. In solution, the graft copolymers are synthesized by conventional free radical techniques using a solvent mixture. The solvent blend, preferably ethyl acetate, hexane and/or heptane, and toluene, imparts the solubility that is necessary for good coating behavior at low and high coat weights. In the practice of the invention, it may also be advantageous to reduce the residual monomer content following polymerization using methods which are known and conventional in the art.

The preferred adhesive compositions are preferably crosslinked using a chemical crosslinking agent. While the use of aluminum and titanium crosslinking agents may be used to practice the invention, it has been discovered that use of titanium containing metal alkoxide crosslinker is necessary for high temperature performance, and is the preferred crosslinker for hydroxyalkyl(meth)acrylate esters. The use of a titanium crosslinker imparts a yellowish color to the final product but, for many applications, is of little concern. The crosslinker is typically added in an amount of from about 0.3% to about 2% by weight of the hybrid polymer.

The adhesive compositions of this invention are preferably tackified. The acrylic and rubber components of the hybrid polymer are believed to form a microphase separated structure in the solid state. Support for this comes from the appearance of two distinct Tg's in the temperature spectrum of viscoelastic properties corresponding to each component. Tackifying resins useful in these compositions are compatible with the rubber macromer phase. Tackifiers compatible with the acrylic phase can, of course, be used with any acrylic polymer and the hybrid polymer of this invention is no exception. However, such tackifiers are typically derived from natural rosin and are associated with poor aging characteristics. It is an objective of this invention to overcome these problems. Thus the preferred tackifiers are synthetic hydrocarbon resins derived from petroleum. Non-limiting examples of rubber phase associating resins include aliphatic olefin derived resins such as those available from Goodyear under the Wingtack® tradename and the Escorez® 1300 series from Exxon. A common $C_5$ tackifying resin in this class is a diene-olefin copolymer of piperylene and 2-methyl-2-butene having a softening point of about 95° C. This resin is available commercially under the tradename Wingtack 95. The resins normally have ring and ball softening points as determined by ASTM method E28 between about 20° C. and 150° C. Also useful are $C_9$ aromatic/aliphatic olefin-derived resins available from Exxon in the Escorez 2000 series. Hydrogenated hydrocarbon resins are especially useful when the long term resistance to oxidation and ultraviolet light exposure is required. These hydrogenated resins include such resins as the Escorez 5000 series of hydrogenated cycloaliphatic resins from Exxon, hydrogenated $C_9$ and/or $C_5$ resins such as Arkon® P series of resins by Arakawa Chemical, hydrogenated aromatic hydrocarbon; resins such as Regalrez 1018, 1085 and the Regalite® R series of resins from Hercules Specialty Chemicals. Other useful resins include hydrogenated polyterpenes such as Clearon® P-105, P-115 and P-125 from the Yasuhara Yushi Kogyo Company of Japan.

The tackifying resin will normally be present at a level of 5 to 50% by weight of the adhesive composition and preferably at a level of about 10 to 40% by weight of the adhesive composition.

The formulated adhesive may also include, excipients, diluents, emollients, plasticizers, antioxidants, anti-irritants, opacifiers, fillers, such as clay and silica, pigments and mixtures thereof, preservatives, as well as other components or additives.

The pressure sensitive adhesives of the invention may advantageously be used in the manufacture of adhesive articles including, but not limited to, industrial tapes and transfer films. The adhesive articles are useful over a wide temperature range, have improved UV resistance and adhere to a wide variety of substrates, including low energy surfaces, such as polyolefins, e.g., polyethylene and polypropylene, polyvinyl fluoride, ethylene vinyl acetate, acetal, polystyrene, powder-coated paints, and the like. Single and double face tapes, as well as supported and unsupported free films are encompassed by the invention. Also included, without limitation, are labels, decals, name plates, decorative and reflective materials, reclosable fasteners, theft prevention and anti-counterfeit devices.

In one embodiment, the adhesive article comprises an adhesive coated on at least one major surface of a backing having a first and second major surface. Useful backing substrates include, but are not limited to foam, metal, fabric, and various polymer films such as polypropylene, polyamide and polyester. The adhesive may be present on one or both surfaces of the backing. When the adhesive is coated on both surfaces of the backing, the adhesive on each surface can be the same or different.

EXAMPLES

In the following examples, the following adhesive test methods were used.

Preparation of Coatings

The adhesive solutions were cast on a silicone coated release liner, air dried for 15 minutes, then dried for 3 minutes at 250° F. in a forced air oven. The films were then laminated to a backing film and conditioned overnight at 22° C. and 50% relative humidity. Unless otherwise indicated the dried adhesive film thickness was 1 mil (25 microns) and the backing film was 2 mil polyester film.

Peel Adhesion

Peel adhesion at 180° between the backing and the adherend test panel was measured according to Test Method number 1 of the Pressure Sensitive Tape Council (PSTC), Northbrook, Ill., adapted as follows. The peel strength was measured after wetting out a stainless steel (SS) panel for 20 minutes or as otherwise indicated. The testing was also carried out on high density polyethylene (HDPE) panels. Unless otherwise indicated, all testing was performed at 22° C. and 50% relative humidity.

Shear Holding Power

Shear holding power was measured according to PSTC Test Method number 7, adapted as follows. The holding power was measured under a shear load of 1 kg on a 0.5 inch by, 1 inch area, applied after wetting out the test panel for 15 minutes. The testing was also carried out on high density polyethylene (HDPE) panels. Unless otherwise indicated, all testing was performed at 22° C. and 50% relative humidity.

Shear Adhesion Failure Temperature (SAFT)

The SAFT measurement was performed by placing a 1 inch by 1 inch bonded test specimen in an oven at 140° F. under a shear load of 1 kg. (15 minutes wet out at room temperature was allowed before applying the load.) The oven temperature was then raised in 10° F. increments every 10 minutes and the temperature at which the bond failed was recorded.

Example 1

This example describes the preparation of a hybrid polymer solution using a methacrylate terminated macromer which was substantially free of strong acid or metal, catalysts. The molecular weight averages of the macromer were determined by GPC, relative to polystyrene standards, to be Mn=6600, Mw=7200 Daltons.

An initial charge-mixture containing 59.73 g 2-ethylhexyl acrylate (2-EHA), 22.72 g ethylene-butylene macromer, 17.05 g methyl acrylate (MA), 5.67g 2-hydroxyethylacrylate (2-HEA), 55.0 g ethyl acetate (EtOAc), 64.19 g hexanes (a standard mixed isomer grade), and 0.28 g azobis (isobutyronitrile) (AIBN) was prepared and charged to a 3 liter 4-neck round bottomed flask equipped with stainless steel stirrer, thermometer, condenser, water bath, and slow addition funnels. The initial charge was heated to reflux while stirring. After 10 minutes at reflux a monomer mix containing 229.0 g 2-EHA, 128.59 g ethylene-butylene macromer, 65.45 g MA, 21.84 g 2-HEA, 27.5 g hexanes and an initiator mix containing 236.5 g EtOAc, 55.0 g hexanes, 1.38 g AIBN were simultaneously, separately, and uniformly added over a period of 2 hours and 3 hours, respectively. At the end of the additions the flask-contents were held at reflux for a further 2 hours. Next the residual monomers were scavenged using a short half-life initiator added over a one hour period and the solution was held under reflux for a further hour. Then diluent consisting of 183.3 g toluene was slowly added to the reactor contents while cooling the contents to room temperature. The polymer solution maintained a fluid viscosity throughout the reaction and showed no tendency to climb the reactor stirring shaft.

The polymer solution had a solids content of 42.7% and a Brookfield viscosity of 2500 mPa·s. The molecular weight averages, determined by gel permeation chromatography, were Mw=560,000 and Mn=34,000.

Examples 2 and 3

Since it has been discovered that use of strong acid catalyst or metal catalyst used to prepare the macromer has adverse effects, experiments were conducted to study the effect of strong acid catalysts on the polymerization process (Example 2), and to study the effect of metal catalysts on the polymerization process (Example 3).

Example 2

A series of polymers was prepared according to the procedure described in Example 1. The macromer used to prepare this series contained p-toluenesulfonic acid (p-TSA) at a range of concentrations. The adverse effect of higher levels of p-TSA is described in Table 1. At the higher levels of acid the in-process solution viscosity increased dramatically due to network formation in the polymer. This ultimately led to gel formation and an unusable product. The problem is first manifested as a tendency for the solution to climb the stirring shaft. This phenomenon is known as the Weissehberg effect. It results in poor mixing and increases the torque with the result that additional power is required to maintain stirring. In an extreme case it can interfere with the shaft bearings and seal. The polymer which results, even if not gelled, exhibits poor, flow and leveling during the adhesive coating process.

TABLE 1

| p-TSA (ppm) | 75 | 150 | 300 | 500 |
|---|---|---|---|---|
| Observation | Fluid viscosity. No shaft climbing. | Fluid viscosity. Minimal shaft climbing. | Increased viscosity but still fluid. Moderate shaft climbing. | High viscosity leading to gel formation. |

Example 3

Polymer solutions were prepared according to Example 1. The macromer used to prepare these polymers contained tin at a range of concentrations. The adverse effect of higher levels of tin is described in Table 2.

TABLE 2

| Sn (ppm) | 100 | 150 | 300 |
|---|---|---|---|
| Observation | Fluid viscosity. No shaft climbing. | Increased viscosity. Significant shaft climbing. | High viscosity. Severe shaft climbing. Gel formation. |

Example 4

Polymer solutions were prepared according to Example 1, substituting an equimolar concentration of hydroxypropyl methacrylate for HEA monomer. The macromer used to prepare these polymers contained tin at a range of concentrations, as provided in Table 3. The results show that a higher level of tin can be tolerated with this monomer without causing problems in the polymerization process.

TABLE 3

| Sn (ppm) | 120 | 230 |
|---|---|---|
| Observation | Fluid viscosity. No shaft climbing. | Slightly increased Viscosity but no shaft climbing. |

Example 5

This example describes the preparation of polymers, with and without a high Tg acrylic comonomer. Two series of hybrid polymers were prepared following the procedure in Example 1 with the exception that the diluent solvent was ethyl acetate. In the second series acrylic acid (AA) was substituted for the HEA. The experimental design explored the use of high Tg monomer, the level of macromer, and the effects of hydroxyl versus carboxyl functionality. Results are shown in Table 4.

TABLE 4

|  | A | B | C | D | E | F | G | H | I | J |
|---|---|---|---|---|---|---|---|---|---|---|
| Composition |  |  |  |  |  |  |  |  |  |  |
| % 2-EHA | 80 | 55 | 25 | 50 | 52.5 | 80 | 55 | 25 | 50 | 52.5 |
| % EB rubber | 15 | 40 | 40 | 15 | 27.5 | 15 | 40 | 40 | 15 | 27.5 |
| % MA | 0 | 0 | 30 | 30 | 15 | 0 | 0 | 30 | 30 | 15 |
| % AA | 5 | 5 | 5 | 5 | 5 | 0 | 0 | 0 | 0 | 0 |
| % HEA | 0 | 0 | 0 | 0 | 0 | 5 | 5 | 5 | 5 | 5 |
| Properties |  |  |  |  |  |  |  |  |  |  |
| Solids, % | 42.6 | 42.1 | 38.6 | 40.1 | 40.8 | 42.5 | 42.1 | 39.6 | 40.2 | 42.6 |
| Viscosity, Pa · s | 1.6 | 2.4 | 13 | >200 | 12 | 9.0 | 1.1 | 8.2 | 16.2 | 13.3 |
| Mw × $10^{-5}$ | 3.2 | 3.9 | 15 | 5.2 | 5.2 | 3.5 | 3.2 | 4.7 | 5.0 | 4.2 |
| Mn × $10^{-4}$ | 2.6 | 2.5 | 2.8 | 3.2 | 3.1 | 2.5 | 2.4 | 2.4 | 3.0 | 2.8 |

All compositions in the design could be prepared by this procedure although in one case, polymer solution D, the viscosity was very high. To help control viscosity, dilution with a hydrocarbon or aromatic hydrocarbon solvent, as used in Example 1, is preferred instead of ethyl acetate. The molecular weights, as determined by GPC, are all high.

Example 6

This example describes the adhesive performance testing of the polymers prepared in Example 5. The samples were tested following the procedures described above. The results are given in Table 5.

TABLE 5

|  | A | B | C | D | E | F | G | H | I | J |
|---|---|---|---|---|---|---|---|---|---|---|
| Adhesion to SS |  |  |  |  |  |  |  |  |  |  |
| Peel, oz/in. | 50 | 32 | 48 | 50 | 57 | 15 | 17 | 27 | 33 | 41 |
| Shear, hours | 0.3 | 0.4 | 41 | 154 | 6 | 0 | 0 | 2 | 55 | 1 |
| Adhesion to HDPE |  |  |  |  |  |  |  |  |  |  |
| Peel, oz/in. | 17 | 13 | 10 | 8 | 9 | 16 | 17 | 8 | 3 | 14 |
| Shear, hours | 0.2 | 0.2 | 13 | 96 | 5 | 0 | 0 | 2 | 28 | 1 |

The results demonstrate that in the absence of the high Tg monomer, methyl acrylate, very poor shear holding power is obtained.

Example 7

This example shows the effect of adding a titanium crosslinking agent to the polymer solutions of Example 5. Samples D and I were omitted since they already exhibit good cohesive strength. A solution consisting of 12.3 g isopropyl alcohol, 15.3 g 2,4-pentanedione and 2.4 g Tyzor GBA (available from the Du Pont Company, Wilmington, Del.) was prepared. Tyzor GBA is a 75% solution in alcohols of bis (2,4-pentanedionate-O,O') bis (2-propanolato)-titanium. The crosslinker solution was stirred into the polymer solutions at the indicated concentrations (weight on weight of polymer) and the adhesive performance was measured. The results are shown in Tables 6 and 7.

TABLE 6

|  | A | B | C | E |
|---|---|---|---|---|
| Active crosslinker, % | 0.375 | 0.375 | 0.075 | 0.15 |
| Adhesion to SS |  |  |  |  |
| Peel, oz/in. | 47 | 31 | 46 | 62 |
| Shear, hours | 5 | 2 | 41 | 34 |
| Adhesion to HDPE |  |  |  |  |
| Peel, oz/in. | 13 | 15 | 14 | 7 |
| Shear, hours | 3.5 | 1.5 | 21 | 20 |

TABLE 7

|  | F | G | H | J |
|---|---|---|---|---|
| Active crosslinker, % | 0.9 | 0.9 | 0.6 | 0.6 |
| Adhesion to SS |  |  |  |  |
| Peel, oz/in. | 5 | 6 | 25 | 22 |
| Shear, hours | 5 | 3 | 55 | 86 |

TABLE 7-continued

|  | F | G | H | J |
|---|---|---|---|---|
| Adhesion to HDPE |  |  |  |  |
| Peel, oz/in. | 2 | 2 | 7 | 6 |
| Shear, hours | 3 | 2 | 24 | 31 |

This demonstrates that the titanium crosslinking agent effectively increases the cohesive strength but that for a high cohesive strength it is necessary to have the high Tg monomer present in the polymer composition (compare samples C and E with A and B, and samples H and J with F and G). While a trade off between adhesion and cohesion is to be expected upon addition of a crosslinker, one sees that the peel strength of the hydroxy-functional polymers F and G, even on stainless steel, is severely reduced.

Example 8

This example shows the compatibility of hydrocarbon tackifying resins with the polymers of Example 5. The tackifying resins were dissolved in the polymer solutions at a high loading (60 parts tackifier to 100 parts polymer on a dry weight basis). The solutions were cast on glass plates, dried, and visually inspected for clarity. Those that were clear were judged to be compatible. The tackifiers used in this experiment were Wingtack® 95, a $C_5$ resin available from the Goodyear Company, and Escorez® 2596, an aromatic/aliphatic resin available from ExxonMobile. The results, denoted by C for compatible and I for incompatible, are shown in Table 8.

TABLE 8

| Polymer | Wingtack 95 | Escorez 2596 |
|---|---|---|
| A | I | I |
| B | I | I |
| C | I | I |
| D | I | I |
| E | C | C |
| F | I | I |
| G | I | I |
| H | C | C |
| I | C | C |
| J | C | C |

These results show that the less polar hydroxy-functional polymers have broader compatibility than the carboxy-functional materials. They also unexpectedly show that the hydroxy-functional polymers which contain the high Tg monomer, methyl acrylate, i.e samples H, I and J, are compatible whereas those without, namely F and G, are incompatible.

Example 9

This example shows the effect on adhesive performance of formulating with a $C_5$ aliphatic hydrocarbon tackifying resin. A series of mixtures were prepared with increasing level of tackifier. To 100 parts of polymer J, on a dry weight basis, 10, 20 and 40 parts of Wingtack 95, 0.8 parts of Tyzor GBA and 0.5 parts of Irganox® 1010 (an antioxidant sold by Ciba Specialty Chemicals) were mixed in solution. The adhesive performance was measured according to the methods in Example 6. A comparison is made with two acrylic polymers, DURO-TAK® 72-8746 (designated A) and DURO-TAK 80-1105 (designated B), sold by National Starch and Chemical Company, and formulated with 15 and 40 parts per hundred polymer of rosin ester tackifier, respectively. The results are shown in Table 9.

TABLE 9

| Tackifier | Acrylic A | Acrylic B | Hybrid Polymer J | | | |
|---|---|---|---|---|---|---|
| concentration, wt % | 15 | 40 | 0 | 10 | 20 | 40 |
| Adhesion to SS | | | | | | |
| Peel, oz/in. | 58 | 66 | 22 | 32 | 48 | 94 |
| Shear, hours | 146 | 4 | 86 | >142 | 62 | 38 |
| SAFT, ° F. | 165 | 165 | n.m. | n.m. | n.m. | 200 |
| Adhesion to HDPE | | | | | | |
| Peel, oz/in. | 14 | 38 | 6 | 18 | 27 | 55 |
| Shear, hours | 82 | 4 | 31 | 15 | 18 | 13 | n.m. = not measured

The results show that the hybrid polymer has an excellent response to tackifier, giving substantial increase in peel strength on stainless steel and especially on the low surface energy substrate HDPE. The hybrid psa of this invention has much higher cohesive strength than the acrylic at high tackifier loading and therefore provides a superior balance of properties. Unexpectedly, the heat resistance, as measured by the SAFT, is significantly higher for the hybrid psa, outperforming a high cohesion acrylic with a much lower tackifier loading.

Example 10

This example shows the effect on adhesive performance of formulating with hydrogenated cycloaliphatic hydrocarbon tackifying resins. Mixtures were prepared as described in Example 8 using 40 parts of Escorez 5415 and 40 parts of Escorez 5600 on 100 parts of polymer J. The crosslinker was Tyzor GBA at 1.2 parts per hundred polymer. Escorez 5415 is a hydrogenated cycloaliphatic resin with a Ring and Ball softening point of 118° C. Escorez 5600 is a hydrogenated aromatic modified cycloaliphatic resin with a Ring and Ball softening point of 103° C. Both adhesives gave a clear film indicating compatibility with the polymer. The adhesive performance was measured according to the methods in Example 6 using a 2 mil thick coating of adhesive. The results are shown in Table 10. For comparison, results are shown for Wingtack 95 under same formulation parameters and test conditions.

TABLE 10

| | Wingtack 95 | Escorez 5415 | Escorez 5600 |
|---|---|---|---|
| Adhesion to SS | | | |
| Peel, oz/in. | 137 | 70 | 78 |
| SAFT, ° F. | 230 | 255 | 290 |
| Adhesion to HDPE | | | |
| Peel, oz/in. | 62 | 52 | 42 |

The results show that the hybrid polymer is compatible with hydrogenated cycloaliphatic resins and that these resins impart additional heat resistance with only slight sacrifice in peel strength on the low energy substrate, HDPE.

Example 11

This example compares a titanium with an aluminum crosslinking agent. A polymer solution was prepared according to Example 1 and formulated with 40% Wingtack 95 and 0.8% Tyzor GBA (75% active) expressed as weight on weight of dry polymer. A second solution was similarly prepared except that the Tyzor was substituted with an equivalent concentration (0.7%) of aluminum tris(acetyl acetonate). The adhesives were then coated and tested according to the procedures described above. The results are shown in Table 11.

TABLE 11

| Crosslinking agent | Tyzor GBA | Al (ac.ac.)$_3$ | |
|---|---|---|---|
| Active concentration, wt % | 0.6 | 0.7 | 1.0 | 1.2 |
| Adhesion to SS | | | | |
| Peel, oz/in. | 91 | 120 | 104 | 83 |
| Shear, hours | 34.8 | 4.0 | 4.3 | 5.0 |

The tests showed that the aluminum crosslinking agent when compared to titanium is ineffective in developing cohesive strength. To confirm the superiority of a titanium crosslinking agent in the present invention, two further samples with an increased concentration of aluminum were prepared and tested. The results, given in the above Table, show that increasing the level of aluminum has little positive effect on shear strength but does reduce the peel adhesion.

Example 12

This example shows the effect of having both hydroxyl and carboxyl functionality in the polymer. A polymer solution was prepared by the method of Example 1 substituting 4 wt % HEA and 1 wt % M for the 5 wt % HEA found in the Example polymer. This is designated as polymer K. A second polymer solution, designated L, was prepared with 0.15 wt % glycidyl methacrylate as an additional component. The adhesive performance of these polymers, tested without additional formulation at dry coating thickness of 2 mils, is shown in Table 12.

TABLE 12

| | Polymer K | Polymer L |
|---|---|---|
| Adhesion to SS | | |
| Peel, oz/in. | 74 | 94 |
| Shear, hours | 25 | 22 |
| SAFT, ° F. | 150 | 150 |
| Adhesion to HDPE | | |
| Peel, oz/in. | 38 | 41 |

Both polymers K and L showed excellent performance for an unformulated base polymer. In particular, the high cohesion and heat resistance gives wider formulating latitude to accept additional tackifier and/or reduce the level of crosslinker. See Example 13.

Example 13

This example shows that the a polymer with combined hydroxyl and carboxyl functionality can be formulated to give substantially improved heat resistance while retaining a high level of peel adhesion. The example further demonstrates that an aluminum crosslinking agent can also be used in this case. The polymer solutions were formulated with Wingtack 95 tackifying resin and crosslinker as shown in Table 13. The weights are expressed on weight of polymers solids. The adhesive coating thickness was 2 mils.

TABLE 13

| Polymer<br>Crosslinking agent | Example 1<br>Tyzor GBA | L<br>Tyzor GBA | L<br>Al (ac.ac.)$_3$ |
| --- | --- | --- | --- |
| Active concentration, wt % | 0.6 | 0.45 | 0.41 |
| Tackifier, wt% | 40 | 50 | 50 |
| Adhesion to SS | | | |
| Peel, oz/in. | 140 | 152 | 149 |
| SAFT, ° F. | 240 | >300 | 280 |
| Adhesion to HDPE | | | |
| Peel, oz/in. | 64 | 66 | 63 |

These results show that a very substantial increase in the heat resistance has been achieved. They further show that an aluminum crosslinking agent can be used with polymer L with some sacrifice in heat resistance but still a good balance of properties. This is to be compared with the poor result obtained when attempting to crosslink the hydroxy-functional polymer of Example 1 with aluminum (see Example 11). The use of aluminum may be desirable in applications where absence of color is important.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A process of making a pressure-sensitive adhesive, said process comprising reacting an acrylic polymer component with a rubber macromer component wherein said acrylic polymer comprises at least one alkyl acrylate monomer containing from, about 4 to about 18 carbon atoms in the alkyl group and at least one monomer whose homopolymer has a glass transition temperature greater than about 0° C., and said macromer has a glass transition temperature of about −30° C. or less, said macromer component being substanially free of catalyst used to prepare the macromer component.

2. The process of claim 1 wherein the macromer comprises poly(ethrylene-butylene), poly(ethylene-propylene) or poly(ethylene-butylene-propylene).

3. The process of claim 1 wherein the macromer is substanially free of metal containing catalyst.

4. The process of claim 1 wherein the macromer is substantially free of strong acid catalyst.

5. The process of claim 1 wherein the macromer has a molecular weight of from about 2,000 to about 10,000.

6. The process of claim 1 wherein the macromer has a glass transition temperature of from about −50° C. to about −70° C.

7. A article of manufacture comprising a pressure-sensitive adhesive, said adhesive comprising an acrylic polymer copolymerized with a rubber macromer, wherein the polymer comprises at least one alkyl acrylate monomer containing from about 4 to about 18 carbon atoms in the alkyl group and at least one monomer whose homopolymer has a transition temperature greater than about 0° C., and wherein the macromer has a glass transition temperature of about −30° C. or less.

8. The article of claim 7 which is a pressure-sensitive adhesive tape.

9. An article of manufacture comprising a pressure-sensitive adhesive, said adhesive comprising an acrylic polymer copolymerized with a rubber macromer, the polymer comprising at least one alkyl acrylate monomer containing from about 4 to about 18 carbon atoms in the alkyl group, and wherein the polymer is crosslinked using a titanium crosslinking agent.

10. The article of claim 9 which is a pressure sensitive adhesive tape.

* * * * *